(12) United States Patent
O'Shea

(10) Patent No.: US 6,200,086 B1
(45) Date of Patent: Mar. 13, 2001

(54) THERMAL BARRIER FOR USE IN A MECHANICAL SEAL ASSEMBLY

(75) Inventor: Michael K. O'Shea, Arvada, CO (US)

(73) Assignee: Sundyne Corporation, Arvada, CO (US)

( * ) Notice: Subject to any disclaimer, the term of this patent is extended or adjusted under 35 U.S.C. 154(b) by 0 days.

(21) Appl. No.: 09/366,968

(22) Filed: Aug. 4, 1999

(51) Int. Cl.[7] .................................................. F04D 29/58
(52) U.S. Cl. ........................ 415/111; 415/180; 415/230; 277/390; 277/930; 277/943; 417/423.8
(58) Field of Search ..................................... 415/111, 112, 415/170.1, 174.2, 180, 229, 230, 231; 277/930, 943, 390, 397; 384/476; 417/423.8, 373

(56) References Cited

U.S. PATENT DOCUMENTS

| | | |
|---|---|---|
| 2,999,702 | 9/1961 | Dunn et al. . |
| 3,115,097 | 12/1963 | Zagar et al. . |
| 3,411,707 | 11/1968 | Zoehfeld . |
| 3,652,183 | * 3/1972 | Pottharst, Jr. .......................... 415/111 |
| 3,904,211 | * 9/1975 | Dega ....................................... 277/42 |
| 4,363,631 | 12/1982 | Wloka . |
| 4,776,759 | 10/1988 | Maskell et al. . |
| 5,160,246 | 11/1992 | Horiuchi . |
| 5,186,006 | * 2/1993 | Petty ....................................... 60/753 |
| 5,375,852 | * 12/1994 | Charhut .................................. 277/42 |
| 5,580,216 | 12/1996 | Munsch . |
| 5,626,460 | * 5/1997 | Franke et al. ......................... 415/177 |

* cited by examiner

Primary Examiner—Edward K. Look
Assistant Examiner—Liam McDowell

(57) ABSTRACT

A mechanical seal assembly is adapted for use with a shaft supported by a bearing, the mechanical seal assembly being located near the bearing. The mechanical seal assembly includes a rotating member attached to the shaft and stationary member engaging the rotating member so that, when the shaft rotates, frictional heat is generated. The mechanical seal assembly includes a thermal barrier for reducing the amount of frictional heat reaching the bearing, thereby reducing the effect of the frictional heat on the lubrication of the bearing.

21 Claims, 4 Drawing Sheets

US 6,200,086 B1

THERMAL BARRIER FOR USE IN A MECHANICAL SEAL ASSEMBLY

FIELD OF THE INVENTION

The present invention generally relates to mechanical seal assemblies, and more particularly to the control of heat generated in mechanical seal assemblies.

BACKGROUND OF THE INVENTION

Mechanical seal assemblies are used in a wide variety of applications to prevent a fluid from leaking therethrough. For example, mechanical seal assemblies are often used in centrifugal pumps which are used to transport a process fluid. A centrifugal pump typically comprises a rotating shaft with an impeller attached to one end of the shaft for pumping the process fluid. The shaft is driven by a motor either directly or indirectly through a transmission assembly such as a gearbox. As a result, the shaft extends from a motor or gearbox housing to a pump housing which encloses the impeller. The motor or gearbox typically requires lubricated bearings to support the rotating shaft. As a result, the mechanical seal assembly is used to contain lubricant inside the motor or gearbox, thereby preventing leakage into the process fluid.

The mechanical seal assembly typically comprises a rotating member which is attached to or otherwise rotates with the shaft and a stationary member which engages the rotating member to form a mechanical seal therebetween. As the shaft rotates, frictional heat is generated between the stationary and rotating members.

The frictional heat generated between the stationary and rotating mechanical seal members can become severe enough to damage other components located nearby. In certain types of pumps, for example, an inboard bearing journally supports the shaft and is typically located inside the gearbox to receive adequate lubrication. Because the impeller is cantilevered off one end of the shaft, however, it is desirable to locate the inboard bearing as close as possible to the impeller to minimize the overhung load and resulting shaft deflection. When the shaft is rotated, the heat generated by the mechanical seal assembly due to friction may be substantial and detrimental to components located in the immediate vicinity of the mechanical seal assembly. For example, the temperature at the inboard bearing may be elevated such that oil coking occurs, thereby causing premature bearing failure from lack of lubrication.

A previous mechanical seal assembly is known which attempted to address the frictional heat problem by forming a rotating member of the mechanical seal assembly out of ceramic, which is a non-heat-conducting material. While this device did reduce the amount of frictional heat reaching the inboard bearing, the amount of localized heat at the point of contact between the stationary and rotating member increased, thereby decreasing the life of the mechanical seal assembly.

SUMMARY OF THE INVENTION

A mechanical seal assembly has a heat barrier to control the amount of frictional heat conducting therefrom without decreasing the life of the seal.

According to one aspect of the present invention, a seal assembly is provided for a shaft rotatably supported in a bearing. The seal assembly comprises a stationary seal member positioned about the shaft and a mating member mounted on the shaft for rotation therewith and having a face in contact with the stationary seal member at which heat is developed during movement of the shaft. A thermal barrier is disposed between the mating member and the bearing.

In accordance with another aspect of the present invention, a mechanical seal assembly is provided for use with a shaft rotatably journaled in an inboard bearing. The assembly comprises a stationary seal member positioned about the shaft. A mating member is supported for rotation with the shaft and has a face engaging the stationary seal. Frictional heat is generated between the mating member and the stationary seal member as the mating member rotates with the shaft. A thermal barrier is sized to fit between the mating member and the inboard bearing, and comprises a non-heat-conductive material to prevent a portion of the frictional heat from conducting from the mating member to the inboard bearing.

In a preferred embodiment, the mating member comprises thermally conductive material to conduct heat away from the point of contact of the mating member and stationary seal member.

In accordance with yet another aspect of the present invention, a pump is provided for use with a motor. The pump comprises a rotatable shaft adapted to be coupled to the motor, an impeller attached to one end of the shaft, and a housing enclosing a portion of the shaft. A bearing is disposed inside the housing and journally supports the shaft. A mating member is attached to and rotates with the shaft, the mating member being positioned near the bearing. A stationary seal member is positioned to engage the mating member to form a mechanical seal so that frictional heat is generated between the mating member and the stationary seal member when the mating member rotates with the shaft. A thermal barrier is disposed between the mating member and the bearing, the thermal barrier comprising a non-heat-conductive material.

In a preferred embodiment, the pump further comprises a sleeve attached to and rotating with the shaft. The sleeve engages a side of the mating member opposite the thermal barrier and is disposed radially inward of the stationary seal member. The sleeve is formed of a thermally conductive material to transfer a portion of the frictional heat away from the inboard bearing.

DESCRIPTION OF THE PREFERRED EMBODIMENTS

Referring now to the figures, a mechanical seal assembly 48 is shown incorporated into a pump 10 having a an impeller shaft 22 rotated by a gearbox 24. The illustrated embodiment is merely exemplary, as the mechanical seal assembly 48 may be used in other types of apparatus having a rotating shaft. The mechanical seal assembly 48 is particularly suited for high shaft speeds, and therefore may also be incorporated into pumps or other apparatus in which the shaft is directly coupled to a high speed motor, without using a gearbox.

Figure 1:
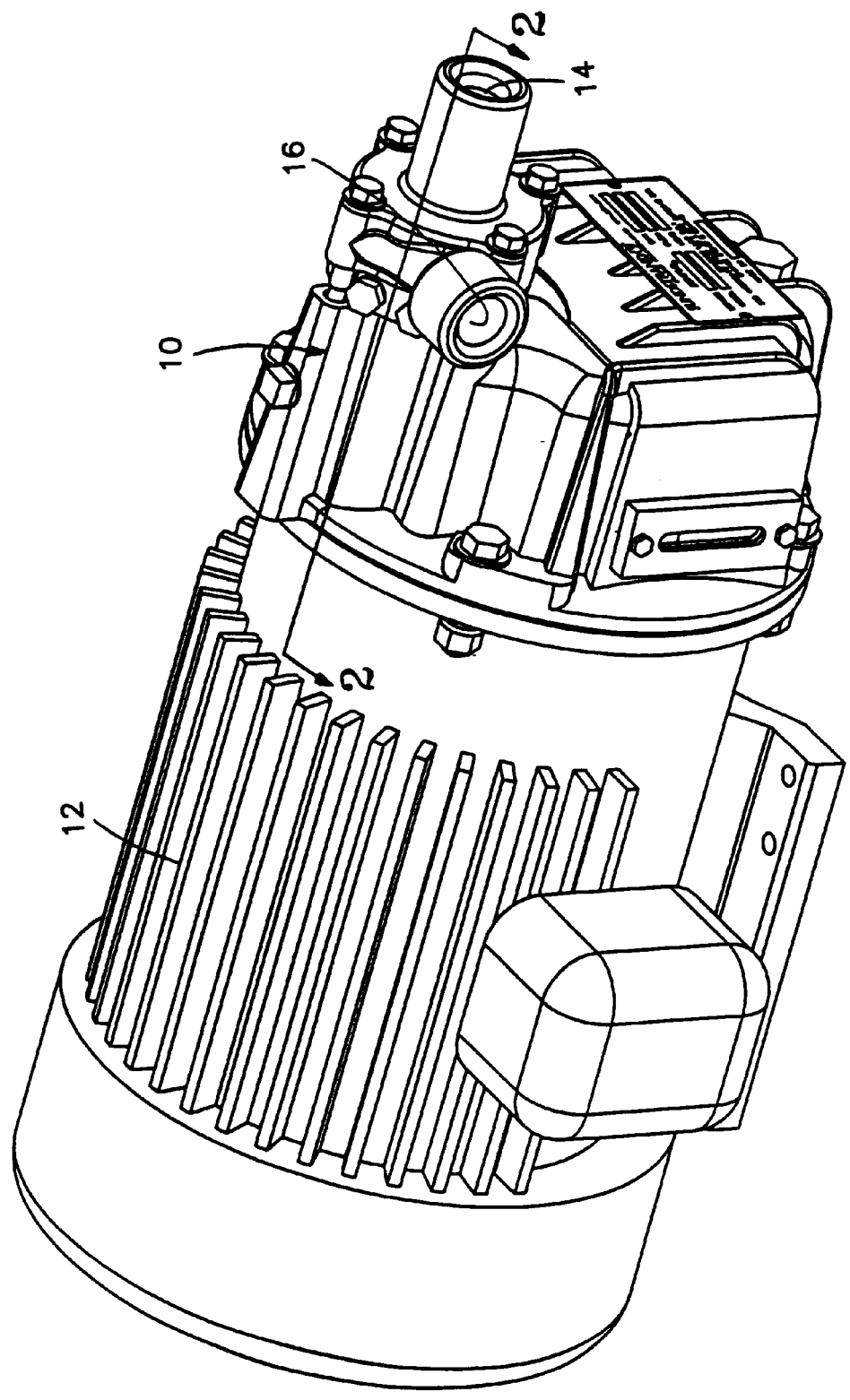
FIG. 1 is an isometric view of a pump incorporating the mechanical seal assembly of the present invention.
Figure 2:
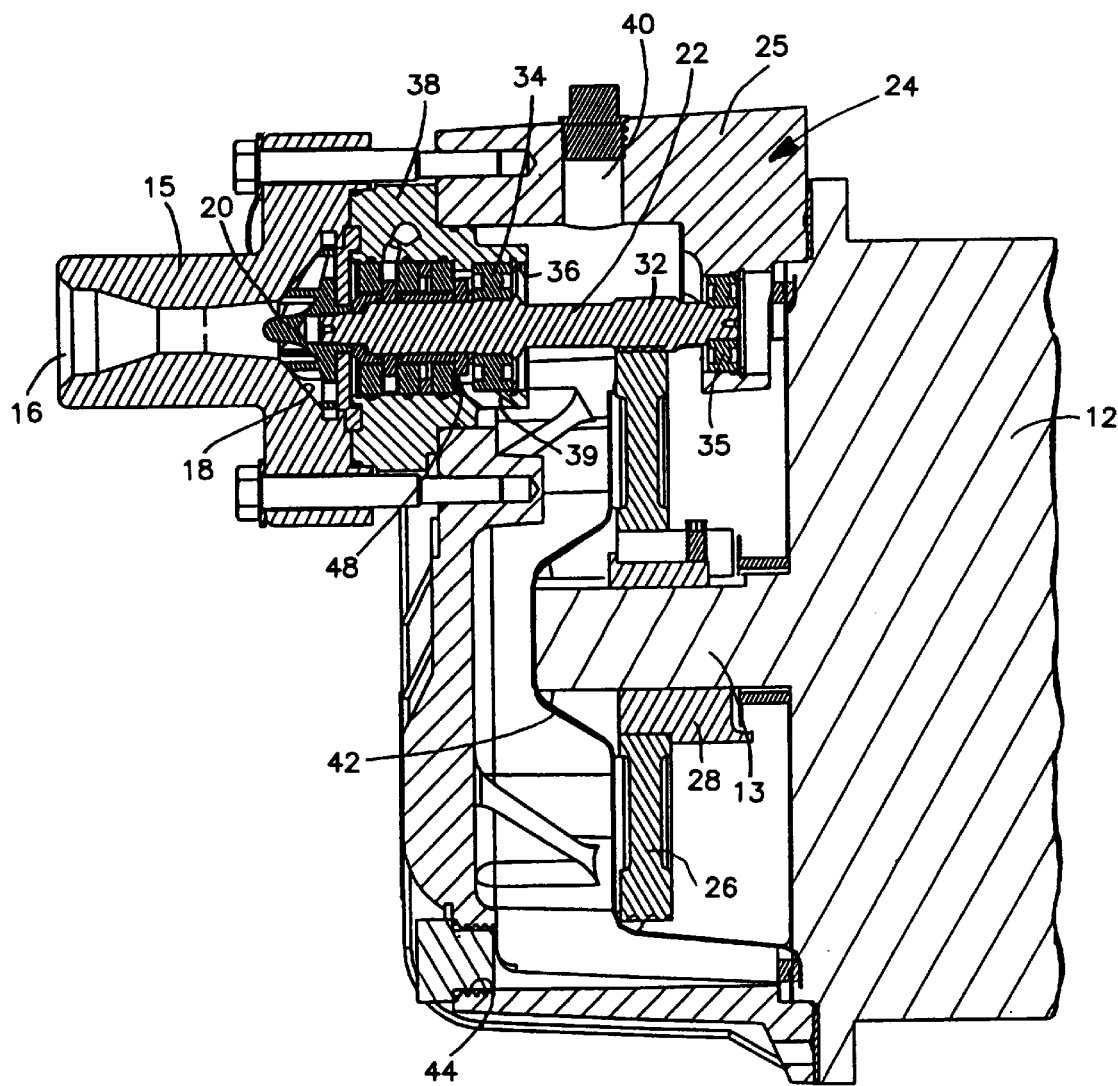
FIG. 2 is a sectional view of the mechanical seal assembly of the present invention taken generally along the lines 2—2 of FIG. 1.

Returning to the illustrated embodiment, a motor 12 is attached to the pump 10 and has a rotating motor shaft 13 for operating the pump 10. The pump 10 generally comprises a pump housing 15 and a gearbox housing 25, with a mechanical seal housing 38 disposed therebetween. The pump housing 15 has an inlet 14 (only visible in FIG. 1) and an outlet 16 connected by a pump chamber 18 (FIG. 2). An impeller 20 is disposed inside the pump chamber 18 and is connected to the impeller shaft 22. The impeller shaft 22 extends from the gearbox housing 25, through the mechanical seal housing 38 to the pump housing 15. As the impeller shaft 22 rotates the impeller 20, process fluid is drawn through the inlet 14 and discharges through the outlet 16 under pressure.

As best shown in FIG. 2, the gearbox 24 drives the shaft 22 at a desired rotational speed. A drive or bull gear 26 is disposed inside the gearbox housing 25 and has a collar 28 sized to fit over the motor shaft 13. The drive gear 26 engages an enlarged portion of the impeller shaft 22 which is formed with gear teeth to form a driven or pinion gear 32. The drive gear 26 has a diameter substantially larger than that of the driven gear 32, and therefore the impeller shaft 22 rotates at a substantially higher speed than the motor shaft 13. For example, the gear ratio between the drive gear 26 and the driven gear 32 may be on the order of 5:1, and therefore a motor shaft speed of 3600 rpm will be converted into a pump shaft speed of approximately 18,000 rpm.

The impeller shaft 22 is rotatably journaled in an inboard bearing 34 located near the impeller 20 and an outboard bearing 35 located near the motor 12. According to the illustrated embodiment, the inboard bearing 34 is supported inside a bearing cavity 36 formed in the mechanical seal housing 38. The inboard bearing 34 has an inner race 60 (FIGS. 3 and 4) with an inside diameter 62 sized to fit the shaft 22 and an outer race 64 having an outside diameter 66 sized to fit into the bearing cavity 36 of the seal housing 38. A plurality of ball bearings 68 are disposed between the inner and outer races 60, 64. The outboard bearing 35 is supported in the gearbox housing 25.

With the mechanical seal housing 38 and impeller shaft 22 in place, the gearbox housing 25 completely encloses the drive gear 26, driven gear 32, and inboard and outboard bearings 34, 35 (FIG. 2). A lubricating port 40 is provided in the gearbox housing 25 through which lubricant such as oil may be poured into the gearbox 24. In the illustrated embodiment, the gearbox utilizes splash lubrication, in which the gearbox 24 is only partially filled with lubricant such that a bottom edge of the driving gear 26 splashes lubricant about an interior of the gearbox 24 as it rotates. As a result, the drive gear 26, driven gear 32, and outboard bearing 35 are directly lubricated. The mechanical seal housing 38 has lubricant ports 39 extending from the interior of the gear box housing 25 to the bearing cavity 36 formed in the mechanical seal housing 38, so that the inboard bearing 34 is also lubricated by the rotating drive gear 26. A shroud 42 disposed inside the gearbox 24 is positioned near the drive gear 26 and has a metering port (not shown) to control the amount of lubricant which reaches the drive gear 26. A drain port 44 is provided near a bottom of the gearbox 24 to allow the lubricant to be drained from the gearbox housing 25.

Figure 3:
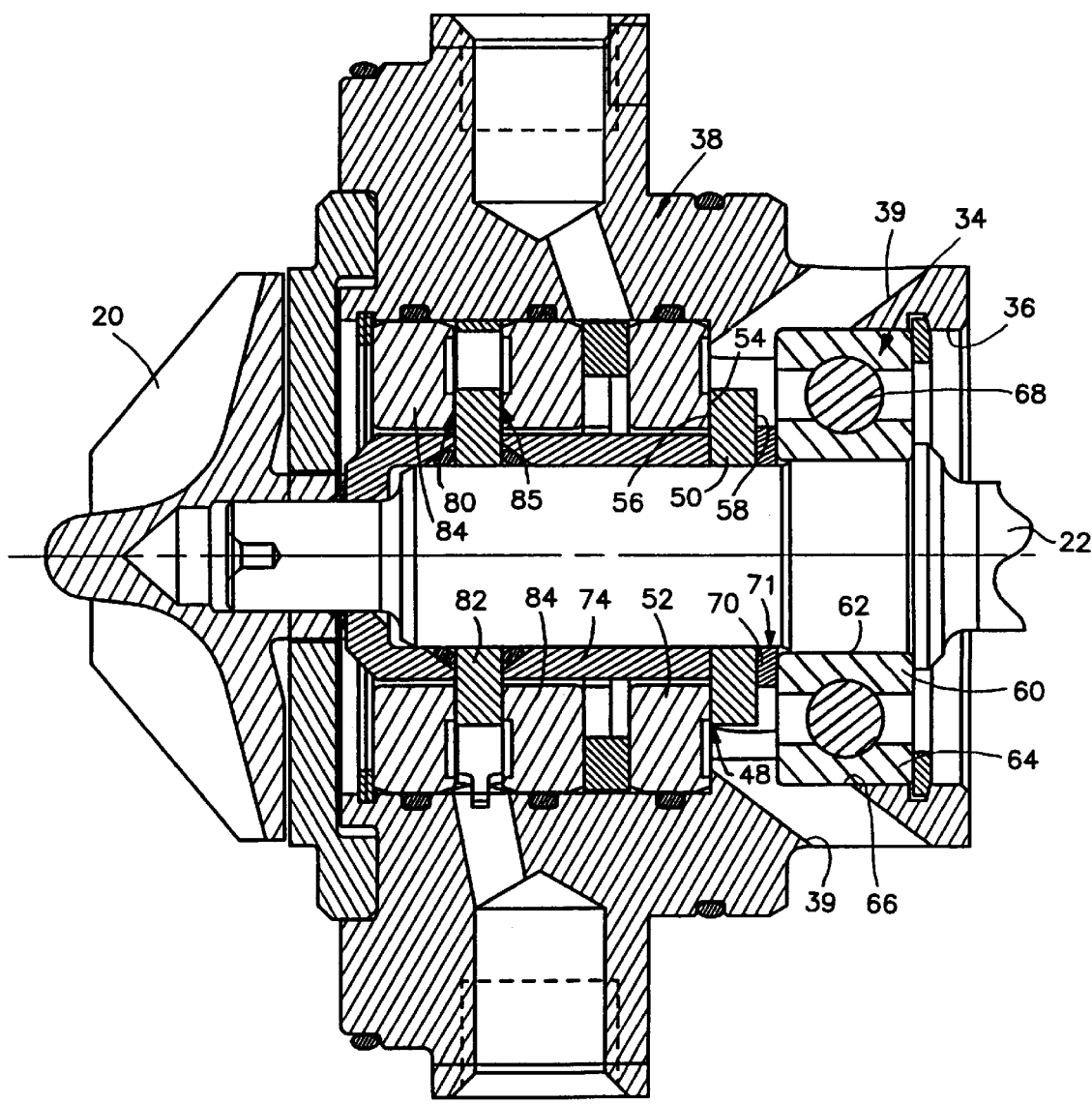
FIG. 3 is an enlarged, partially sectional view of the mechanical seal assembly of FIG. 2.

The mechanical seal assembly 48 is disposed inside the mechanical seal housing 38 for preventing lubricant in the gearbox 24 from leaking into the process fluid. As best shown in FIG. 3, the mechanical seal assembly 48 includes a stationary seal member 52 and a mating member 50 supported for rotation with the shaft 22. The stationary seal member 52 is attached to the seal housing 38 and has a seal face 54 engaging a front face 56 of the mating member 50. The engagement of the seal face 54 with the front face 56 creates a seal which prevents lubricant from flowing therethrough. While the stationary seal member 52 and the mating member 50 of the illustrated embodiment have annular shapes, other shapes may be used as long as a continuous seal is formed about the impeller shaft 22 during rotation of the mating member 50. As the impeller shaft 22 rotates, friction between the mating member 50 and stationary seal member 52 generates a significant amount of heat. Despite this, the mating member 50 of the preferred embodiment is formed of a thermally conductive material, such as tungsten carbide, to prevent the frictional heat from being intensely focused at the contact area between the seal face 54 and front face 56. Accordingly, a portion of the frictional heat conducts through the mating member 50 to a rear face 58 which faces toward the inboard bearing 34.

A thermal barrier 71 is provided for reducing the amount of frictional heat reaching the inboard bearing 34. In the embodiment illustrated at FIG. 3, the thermal barrier 71 is formed as a separate spacer 70 disposed between the inner race 60 of the inboard bearing 34 and the mating member 50. In the illustrated embodiment, the spacer 70 is formed as a ring, however the spacer 70 may be formed in other shapes in accordance with the present invention. The spacer 70 comprises a non-heat-conducting material, such as a non-heat conductive ceramic, which impedes the transfer of heat therethrough. In an alternative embodiment illustrated in FIG. 4, the thermal barrier 71 is formed as a non-heat-conductive coating disposed between the mating member 50 and the inboard bearing 34. In the illustrated embodiment, the coating 72 is applied to the rear face 58 of the mating member 50, but may alternatively be applied to the inner race 62 of the inboard bearing 34. In each of the above exemplary embodiments, the thermal barrier 71 prevents a substantial amount of frictional heat from conducting toward the inboard bearing 34.

A shaft sleeve 74 is provided to further reduce the amount of frictional heat reaching the inboard bearing 34. The shaft sleeve 74 completely surrounds a portion of the impeller shaft 22 and is located radially inward of the stationary seal member 52. The shaft sleeve 74 extends axially from the front face 56 of the mating member 50 toward the impeller 20 (and away from the inboard bearing 34). The shaft sleeve 74 is supported for rotation with the impeller shaft 22, and is formed of a thermally-conductive material, such as stainless steel. As a result, the shaft sleeve 74 not only prevents a portion of the impeller shaft 22 from being exposed to the process fluid, thereby reducing corrosion, but also, by being formed of a thermally conductive material, the sleeve conducts heat away from the inboard bearing 34. Accordingly, heat conducting from the front face 56 to the sleeve 74 is conducted along the sleeve 74 to the impeller shaft 22 to eventually be removed through convection by the process fluid.

Figure 4:
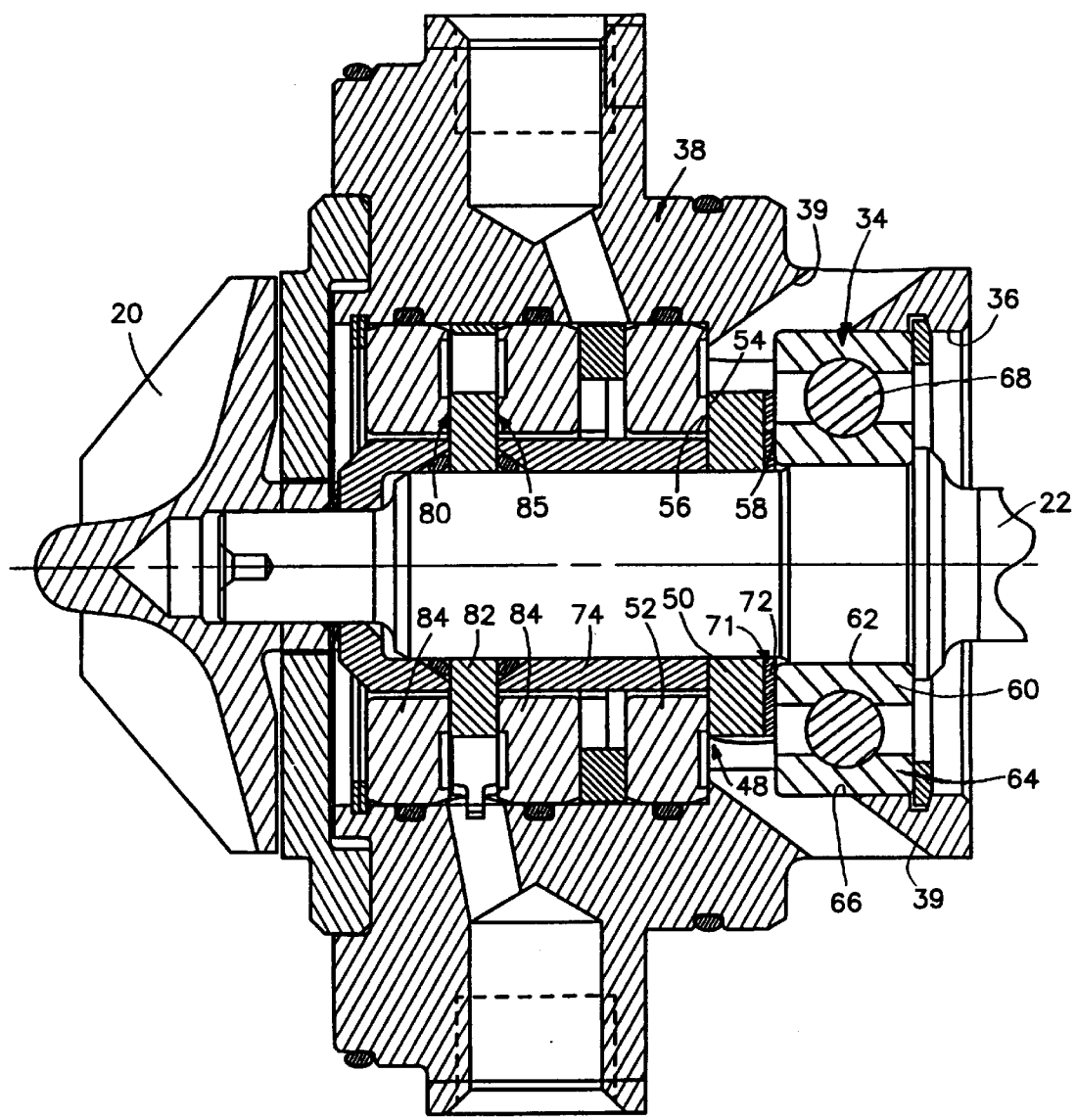
FIG. 4 is an enlarged, partially sectional view of an alternative mechanical seal assembly embodiment.

According to the illustrated embodiment, first and second process fluid seal assemblies 80, 85 are provided for preventing process fluid from entering the gearbox 24. The first and second process fluid seal assemblies 80, 85 are similar to the first mechanical seal assembly 48, each assembly including a stationary seal member 84 which engages a common mating member 82 (FIGS. 3 and 4). The mating member 82 is attached to and rotates with the shaft 22. The engagement of the mating member 82 with the stationary seal members 84 prevents flow of process fluid therethrough. While a double process fluid seal configuration is illustrated, it will be appreciated that a single or other seal configurations may be used without departing from the present invention.

In operation, the motor shaft 13 rotates the drive gear 26 which engages the driven gear 32 of the shaft 22 to, in turn, rotate the impeller shaft 22. The mating member 50 and inner race 60 of the inboard bearing 34, as well as the thermal barrier 71 disposed therebetween, rotate with the shaft 22. The seal member 52 is stationary, so that the rotation of the mating member 50 creates frictional heat. The frictional heat is conducted through the mating member 50 both along the front face 56 toward the sleeve 74 and toward the rear face 58. The thermal barrier 71 prevents a significant amount of the frictional heat conducted to the rear face 58 from reaching the inboard bearing 34, thereby maintaining lubrication of the bearing. Frictional heat at the front face 56 is allowed to conduct through the sleeve 74 and the portion of the impeller shaft 22 adjacent the sleeve. The heat conducted through the sleeve 74 to the impeller shaft 22 is ultimately removed through convection by the process fluid being pumped.

In light of the above, the present invention provides a thermal barrier for use in a mechanical seal assembly which controls frictional heat generated in the assembly without deteriorating the quality of the seal formed by the assembly. In the exemplary pump embodiment described above, the thermal barrier is positioned between an inboard bearing and a mating member so that the amount of heat conducting to the inboard bearing is reduced. The apparatus described herein further allows frictional heat to flow along the shaft in a direction away from the inboard bearing so that the frictional heat does not remain localized at the point of contact between the mating member and the stationary seal member.

While the present invention has been shown in the context of a single-stage centrifugal pump, the present invention is not limited to use in such a device, and may instead be used in a wide array of other types of devices, such as other types of pumps, compressors, gearboxes, or other apparatus in which a shaft is rotated at a speed sufficient to generate frictional heat in a mechanical seal assembly.

Numerous modifications and alternative embodiments of the invention will be apparent to those skilled in the art in view of the foregoing description. Accordingly, this description is to be construed as illustrative only and is for the purpose of teachings those skilled in the art the best mode of carrying out the invention. The details of the structure may be varied substantially without departing from the spirit of the invention, and the exclusive use of all modifications which come within the scope of the appended claims is reserved.

What is claimed is:

1. A seal assembly for a shaft rotatably supported in a bearing, comprising
   a stationary seal member positioned about the shaft;
   a mating member mounted on the shaft for rotation therewith and having a face in contact with the stationary seal member at which heat is developed during movement of the shaft; and
   a thermal barrier disposed between the mating member and the bearing.
2. The seal assembly of claim 1, in which the bearing has an inner race sized to engage and rotate with the shaft, and a stationary outer race, and the thermal barrier is disposed between the mating member and the inner race.
3. The seal assembly of claim 2, in which the thermal barrier comprises a separate spacer.
4. The seal assembly of claim 3, in which the spacer comprises a non-heat-conductive ceramic material. member.
5. The seal assembly of claim 2, in which the thermal barrier comprises a non-heat-conductive coating disposed between the mating member and the inner race.
6. The seal assembly of claim 5, in which the non-heat-conductive coating is applied to the mating member.
7. A mechanical seal assembly for use with a shaft rotatably journaled in an inboard bearing, the assembly comprising:
   a stationary seal member positioned about the shaft;
   a mating member supported for rotation with the shaft and having a face engaging the stationary seal, frictional heat being generated between the mating member and the stationary seal member as the mating member rotates with the shaft; and
   a thermal barrier sized to fit between the mating member and the inboard bearing, the thermal barrier comprising a non-heat-conductive material to prevent a portion of the frictional heat from conducting from the mating member to the inboard bearing.
8. The mechanical seal assembly of claim 7, in which the mating member comprises thermally conductive material.
9. The mechanical seal assembly of claim 7, in which the inboard bearing has an inner race sized to engage and rotate with the shaft, and a stationary outer race, and the thermal barrier is disposed between the mating member and the inner race.
10. The mechanical seal assembly of claim 9, in which the thermal barrier comprises a separate spacer.
11. The mechanical seal assembly of claim 10, in which the spacer comprises a non-heat-conductive ceramic material.
12. The mechanical seal assembly of claim 9, in which the thermal barrier comprises a non-heat-conductive coating disposed between the mating member and the inner race.
13. The mechanical seal assembly of claim 12, in which the non-heat-conductive coating is applied to the mating member.
14. A pump for use with a motor, the pump comprising:
   a rotatable shaft adapted to be coupled to the motor;
   an impeller attached to one end of the shaft;
   a housing enclosing a portion of the shaft;
   a bearing disposed inside the housing and journally supporting the shaft;
   a mating member attached to and rotating with the shaft, the mating member positioned near the bearing;
   a stationary seal member positioned to engage the mating member to form a mechanical seal, a frictional heat being generated between the mating member and the stationary seal member when the mating member rotates with the shaft; and
   a thermal barrier disposed between the mating member and the bearing, the thermal barrier comprising a non-heat-conductive material.
15. The pump of claim 14, in which the mating member comprises thermally conductive material.
16. The pump of claim 14, further comprising a sleeve attached to and rotating with the shaft, the sleeve engaging a side of the mating member opposite the thermal barrier and being disposed radially inward of the stationary seal member, the sleeve being formed of a thermally conductive material to transfer a portion of the frictional heat away from the inboard bearing.

17. The pump of claim 14, in which the bearing has an inner race sized to engage and rotate with the shaft, and a stationary outer race, and the thermal barrier is disposed between the mating member and the inner race.

18. The pump of claim 17, in which the thermal barrier comprises a separate spacer.

19. The pump of claim 18, in which the spacer comprises a non-heat-conductive ceramic material.

20. The pump of claim 17, in which the thermal barrier comprises a non-heat-conductive coating disposed between the mating member and the inner race.

21. The pump of claim 20, in which the non-heat-conductive coating is applied to the mating member.

* * * * *